(12) United States Patent
Rahimzai

(10) Patent No.: US 12,012,161 B2
(45) Date of Patent: Jun. 18, 2024

(54) HYDRAULIC STEERING ARRANGEMENT

(71) Applicant: Danfoss Power Solutions ApS, Nordborg (DK)

(72) Inventor: Abdul Karim Rahimzai, Sønderborg (DK)

(73) Assignee: DANFOSS POWER SOLUTIONS APS, Nordborg (DK)

( * ) Notice: Subject to any disclaimer, the term of this patent is extended or adjusted under 35 U.S.C. 154(b) by 99 days.

(21) Appl. No.: 17/957,342

(22) Filed: Sep. 30, 2022

(65) Prior Publication Data

US 2023/0103434 A1 Apr. 6, 2023

(30) Foreign Application Priority Data

Oct. 1, 2021 (EP) ..................................... 21200426

(51) Int. Cl.
*B62D 5/093* (2006.01)
*B62D 5/06* (2006.01)
(Continued)

(52) U.S. Cl.
CPC ............. *B62D 5/093* (2013.01); *B62D 5/062* (2013.01); *B62D 5/075* (2013.01); *B62D 5/09* (2013.01)

(58) Field of Classification Search
CPC ........ B62D 5/062; B62D 5/065; B62D 5/075; B62D 5/09; B62D 5/093; F15B 11/162; F15B 13/022; F15B 13/027
See application file for complete search history.

(56) References Cited

U.S. PATENT DOCUMENTS

| 5,101,860 A | 4/1992 | Stephenson |
| 5,819,532 A | 10/1998 | Wang et al. |

(Continued)

FOREIGN PATENT DOCUMENTS

| DE | 101 64 392 A1 | 7/2003 |
| EP | 2 610 139 A1 | 7/2013 |

*Primary Examiner* — Michael Leslie
(74) *Attorney, Agent, or Firm* — McCormick, Paulding & Huber PLLC

(57) ABSTRACT

A hydraulic steering arrangement (1) including a supply port (2), a return port (4), a working port arrangement having two working ports (5, 6), a main flow path (7) between the supply port (2) and one of the working ports (5) and a return flow path (8) between the other working port (6) and the return port (4), wherein the main flow path (7) includes a main orifice (A1), a flow meter (9), a first flow meter orifice (A2) upstream the flow meter (9), a second flow meter orifice (A3) downstream the flow meter (9), and a first working port orifice (A4), the return flow path (8) includes a second working port orifice (A5), a load sensing point (17) is arranged between the main orifice (A1) and the first flow meter orifice (A2), a drain orifice (Ad) is arranged between the load sensing point (17) and the return port (4), and a priority valve arrangement (10) is arranged between the supply port (2) and the main orifice (A1). Such a steering arrangement should enable a high steering speed without loss of comfort. To this end a load sensing port (16) of the priority valve arrangement (10) is connected to the load sensing point (17), characterized in that a priority outlet (CF) of the priority valve arrangement (10) is directly connected to the main orifice (A1), the load sensing port (16) of the priority valve arrangement (10) is directly connected to the load sensing point (17) and the main flow path (7) includes a check valve (24) between the load sensing point (17) and the working port (5) of the main flow path (7), the check (Continued)

valve (24) opening in a direction towards the working port (5).

9 Claims, 2 Drawing Sheets

(51) Int. Cl.
*B62D 5/07* (2006.01)
*B62D 5/09* (2006.01)

(56) References Cited

U.S. PATENT DOCUMENTS

| | | | |
|---|---|---|---|
| 7,516,757 B2 * | 4/2009 | Gehlhoff | B62D 5/097 |
| | | | 60/384 |
| 9,616,919 B2 * | 4/2017 | Arbjerg | B62D 5/093 |
| 9,744,990 B2 * | 8/2017 | Porskrog | B62D 5/062 |
| 9,920,776 B2 * | 3/2018 | Krahn | B62D 5/097 |
| 10,625,775 B2 * | 4/2020 | Soerensen | B62D 5/065 |
| 10,953,915 B2 * | 3/2021 | Arbjerg | B62D 5/12 |
| 10,960,923 B2 * | 3/2021 | Bergmann | B62D 5/09 |
| 11,370,480 B2 * | 6/2022 | Rahimzai | B62D 5/09 |
| 11,459,027 B2 * | 10/2022 | Rahimzai | B62D 5/062 |

* cited by examiner

HYDRAULIC STEERING ARRANGEMENT

CROSS-REFERENCE TO RELATED APPLICATION

This application claims foreign priority benefits under U.S.C. § 119 from European Patent Application No. 21200426.1, filed Oct. 1, 2021, the content of which is hereby incorporated by reference in its entirety.

TECHNICAL FIELD

The present invention relates to a hydraulic steering arrangement comprising a supply port, a return port, a working port arrangement having two working ports, a main flow path between the supply port and one of the working ports and a return path between the other working port and the return port, wherein the main flow path comprises a main orifice, a flow meter, a first flow meter orifice upstream the flow meter, a second flow meter orifice downstream the flow meter, and a first working port orifice, the return flow path comprises a second working port orifice, a load sensing point is arranged between the main orifice and the first flow meter orifice, a drain orifice is arranged between the load sensing point and the return port, and a priority valve arrangement is arranged between the supply port and the main orifice, wherein a load sensing port of the priority valve arrangement is connected to the load sensing point.

BACKGROUND

Such a hydraulic steering arrangement is used to steer a vehicle, in particular a heavy vehicle. Such a heavy vehicle has a quite large steering motor which is connected to the working port arrangement. This large steering motor requires a certain flow of hydraulic fluid. The flow determines the velocity with which the steered wheels can be moved or when the vehicle is an articulated steered vehicle, with which the parts of the vehicle can be tilted with respect to each other.

When the steered wheels during a movement in a steering direction hit against an obstacle, the driver of the vehicle experiences a sudden movement of the steering wheel. This behaviour is often called "kick back". Kick back is also experienced when the driver starts steering to same steering direction as he just did before coming to the neutral position. In other words, when steering for example to the right, the chamber of the cylinder which pushes the piston to the right is loaded with high pressure. As the operator stops steering, this high pressure will be trapped in the cylinder chamber as well as the hose connected with the right port of the steering unit because all the orifices in the spool sleeve set are closed while the pressure at the load sensing point is dropped to tank and the pressure of supply port is dropped to margin pressure. If the operator starts steering in the same direction again (to the right), there will be flow from the high-pressure side of the cylinder to the load sensing chamber and supply port of the steering unit through the main flow path which causes the gearwheel and thus the steering wheel to turn to the opposite direction abruptly.

In order to avoid such a kick back, a check valve is arranged between the main orifice and the priority valve arrangement. If the steering arrangement is a dynamic steering arrangement, a further check valve is arranged between the load sensing port of the check valve arrangement and the load sensing point in the main flow path.

The pressure drop which can be observed over the check valve reduces the pressure difference over the main orifice. The pressure difference over the main orifice, the so called margin, determines the flow through the main orifice and consequently the flow which can be supplied to the steering motor via the working port orifice.

SUMMARY

The object underlaying the invention is to enable a high steering speed without loss of comfort.

This object is solved with a hydraulic steering arrangement as described at the outside in that a priority outlet of the priority valve is directly connected to the main orifice, the load sensing port of the priority valve arrangement is directly connected to the load sensing point and the main flow path comprises a check valve between the load sensing point and the working port of the main flow path, the check valve opening a direction towards the working port.

In such a hydraulic steering arrangement there is no check valve between the priority valve arrangement and the main orifice, so that the pressure difference over the main orifice is not reduced by a pressure drop over the check valve between the priority valve arrangement and the main orifice. Nevertheless, a kick back can be avoided by providing a check valve downstream the load sensing point. This has the additional advantage that a second check valve between the load sensing point and the load sensing port of the priority valve arrangement can be avoided. It is possible to enable a high steering speed in LS steering units without loss of comfort and even in LS static steering units it is possible to avoid kickback In an embodiment of the invention the check valve is arranged between the load sensing point and the first flow meter orifice. The first flow meter orifice is usually termed "A2" orifice.

In an alternative embodiment the check valve is arranged downstream in the second flow meter orifice. The second flow meter orifice is usually termed "A3" orifice.

In an embodiment of the invention the check valve is arranged between the second flow meter orifice and the working port orifice of the main flow path. The working port orifice of the main flow path is usually termed "A4" orifice. Thus, it is of advantage when the check valve is arranged just before the A2 orifice or just behind the A3 orifice. In all cases a check valve at these positions is sufficient to avoid a kick back. A pressure drop over the check valve does not adversely affect the steering speed of the steering motor.

In an embodiment the hydraulic steering unit comprises a housing and a set of spool and sleeve in a bore of the housing, wherein the check valve is arranged in the housing. This makes it possible to arrange the check valve as close as possible to the A2 orifice or to the A3 orifice.

In an embodiment of the invention the check valve comprises a valve element, for example in form of a ball, which in one position seals against a part of the housing and in another position is held in place by a component mounted in the housing from the outside of the housing. This results in a very simple construction.

In an embodiment of the invention the component is mounted in the housing from a front face of the housing. This means that the valve element is moved in an axial direction in relation to an axis of rotation of sleeve and spool. Thus, the check valve does not require much additional space.

In an embodiment of the invention the component is screwed into the housing. This is a simple way of mounting the component.

In an embodiment of the invention the priority valve arrangement comprises a load sensing flow path from the priority outlet to the load sensing port. This is possible although there is no check valve in this path. The negative effect of a kick back can be avoided by arranging the check valve in the main flow path.

BRIEF DESCRIPTION OF THE DRAWINGS

Embodiments of the invention will now be described with reference to the drying, wherein.

DETAILED DESCRIPTION

Figure 1:
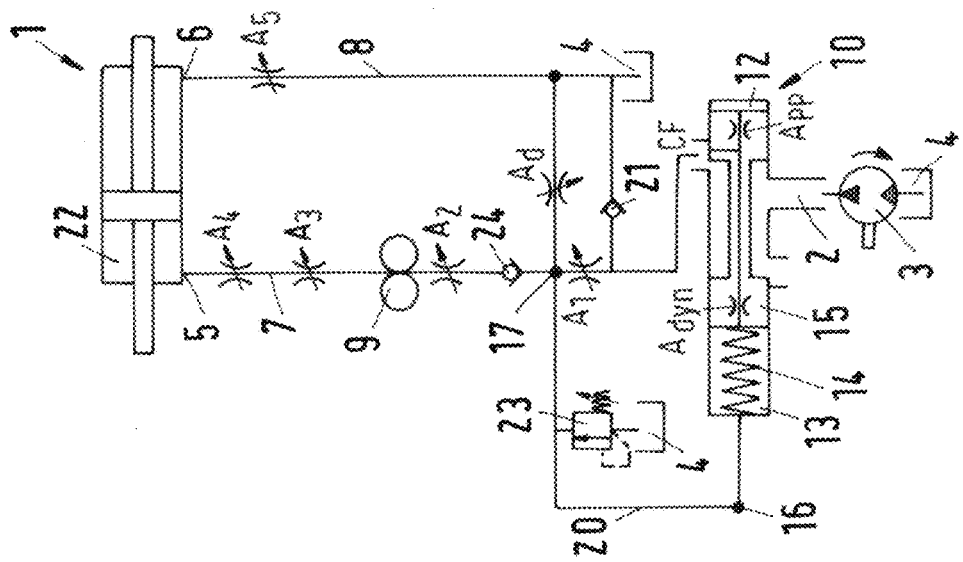
FIG. 1 shows a hydraulic steering arrangement according to the prior art.

FIG. 1 shows a hydraulic steering arrangement 1 comprising a supply port 2 which is connected to a pressure source 3, for example a pump. The steering arrangement 1 furthermore comprises a tank port 4 and two working ports 5, 6 forming a working port arrangement.

A main flow path 7 is arranged between the supply port 2 and one of the working ports 5, 6. The other working port 6, 5 is connected to the return port 4 by means of a return flow path 8. The choice of the working ports 5, 6 depends on the direction to which a vehicle equipped with the hydraulic steering arrangement 1 should be steered.

The main flow path 7 comprises a main orifice A1, a flow meter 9, a first flow meter orifice A2 upstream the flow meter 9, a second flow meter orifice A3 downstream the flow meter 9 and a first working port orifice A4 between the second flow meter orifice A3 and the working port 5.

The return flow path 8 comprises a second working port orifice A5.

The main flow path is connected to a supply port 2 by means of a priority valve arrangement 10. The priority valve arrangement 10 comprises a priority valve 11 and a load sensing orifice ALS. A priority outlet CF of the priority valve 11 is connected to the main flow path 7. The priority outlet CF is connected via orifice APP to a first pressure chamber 12 and via a second orifice Adyn to a second pressure chamber 13 in which a spring 14 is arranged.

The dynamic orifice Adyn defines a load sensing flow path from the priority outlet CF of the priority valve arrangement 10 to the load sensing port 16.

The priority valve 11 comprises a spool 15 the position of which is determined by the pressure difference between the two pressure chambers 12, 13 and the force of the spring 14.

The priority valve arrangement 10 comprises a load sensing port 16 which is connected to a load sensing point 17 in the main flow path between the main orifice A1 and the first flow meter orifice A2.

The main flow path 7 comprises a check valve 18 opening in a direction away from the priority valve arrangement 10. A further check valve 19 is arranged in a load sensing line 20 between the load sensing port 16 of the priority valve arrangement 10 and the load sensing port 17 in the main flow path.

The main flow path 7 is connected to the return flow path 8 by means of a further check valve 21 which is connected to the main flow path 7 at a point between the main orifice A1 and the check valve 18. Furthermore, the load sensing point 17 of the main flow path 7 is connected to the return flow path 8 via a drain orifice Ad.

Figure 4:
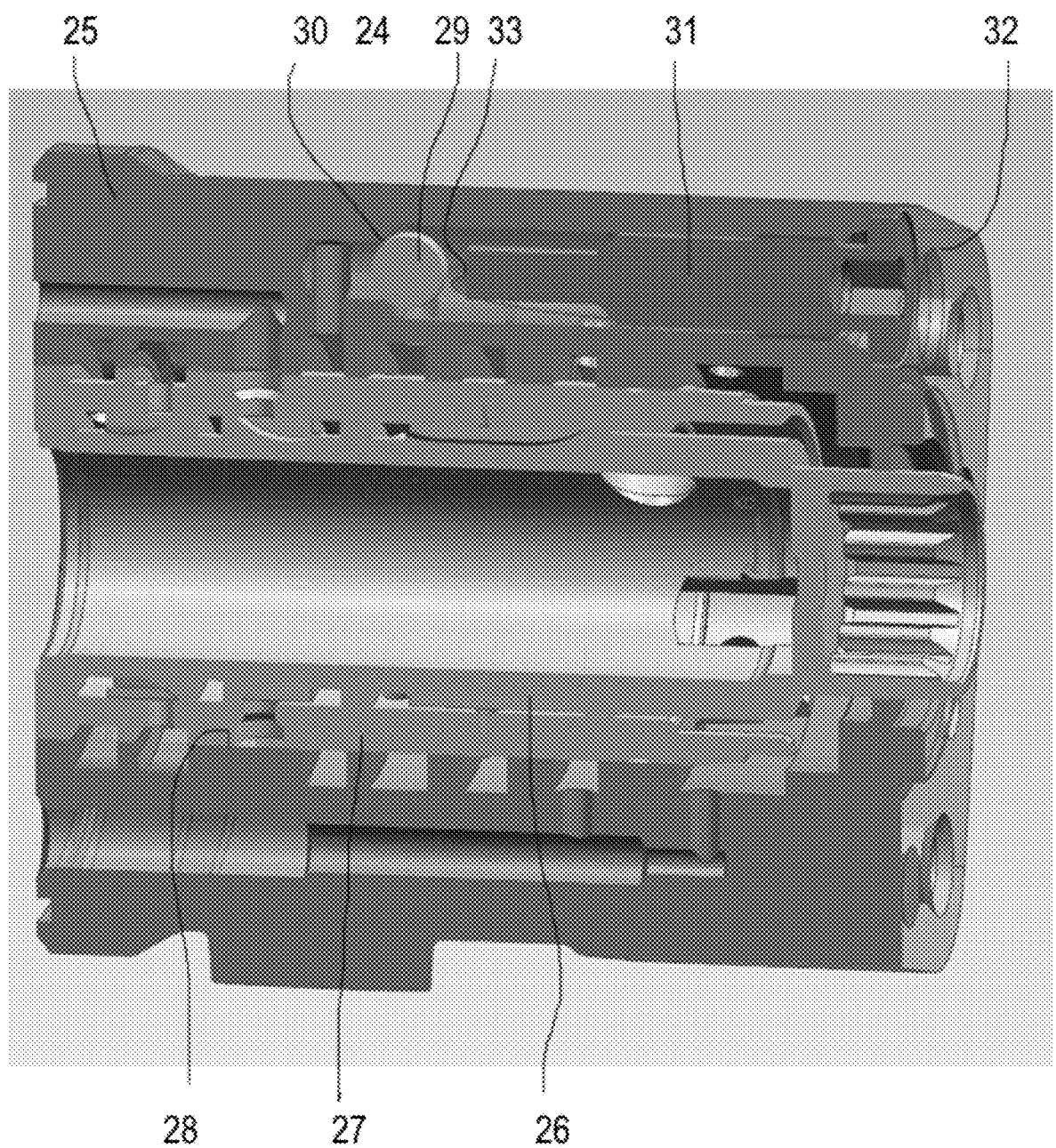
FIG. 4 shows a schematic view of parts of the steering arrangement.

Such a steering arrangement comprises (FIG. 4) a housing 25 and a set of spool 26 and sleeve 27 which are arranged in a bore 28 of the housing 25. The steering arrangement is usually operated by a driver of the vehicle by means of a steering wheel (not shown). When the steering wheel is rotated, the spool 26 and the sleeve 27 are rotated with respect to each other. This rotation opens some orifices (main orifice A1, first flow meter orifice A2, second flow meter orifice A3, first working port orifice A4, second working port orifice A5) and closes the drain orifice Ad. Hydraulic fluid flows from the priority valve arrangement 10 through the main flow path 7 to the working port arrangement and to a steering motor 22 connected to the working port arrangement 5, 6. This flow drives the flow meter 9 which in turn restores the neutral position of spool and sleeve relative to each other.

The flow through the main flow path 7 is basically determined by a pressure difference over the main orifice A1. This pressure difference is the difference between the pressure at the priority outlet CF of the priority valve 11 and a load sensing pressure at the load sensing point 17, however, this difference is reduced by a pressure drop over the check valve 18. Thus, the maximum flow achievable through the main orifice A1 is reduced by the pressure difference over the check valve 18. This in turn leads to the effect that the flow to the steering motor 22 cannot be increased to the maximum flow, so that that the steering speed of the steering motor 22 is not at an optimum.

Figure 2:
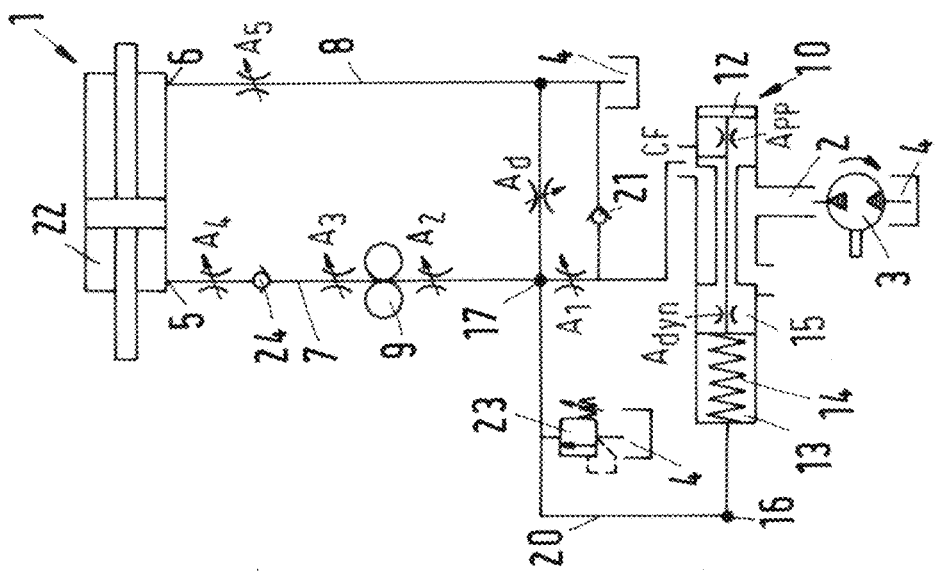
FIG. 2 shows a first hydraulic steering arrangement according to the invention.
Figure 3:
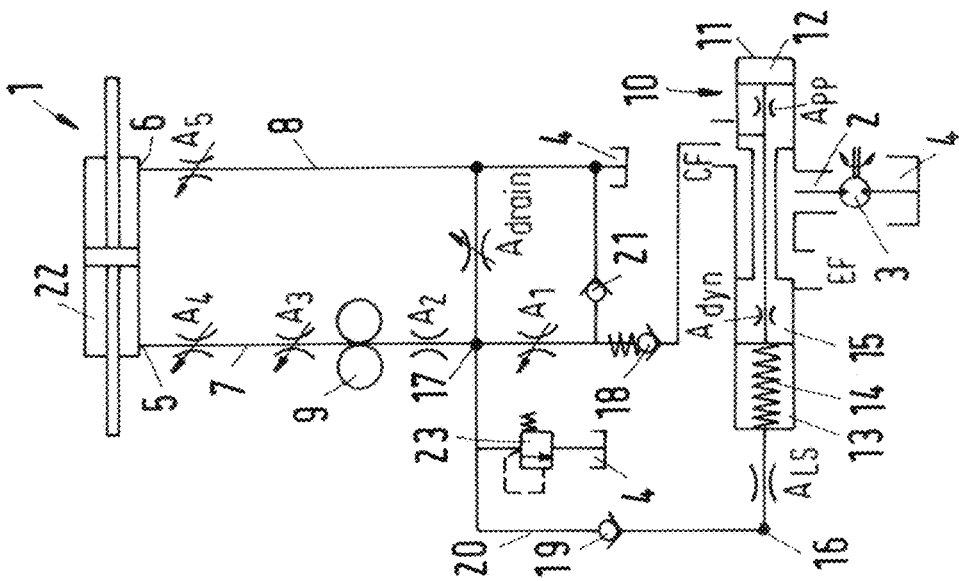
FIG. 3 shows a second hydraulic steering arrangement according to the invention.

In order to allow for a large steering speed, the prior art steering unit shown in FIG. 1 has been modified, as shown in FIGS. 2 and 3.

The same elements are referred to with the same reference numerals in all figures.

FIGS. 2 and 3 show in principle the same steering unit, since the A2 orifice and the A3 orifice "change position" dependent on the steering direction.

As can be seen in FIGS. 2 and 3 the main orifice A1 is directly connected to the priority output CF of the priority valve arrangement 10. In other words, there is no check valve or other element in the line between the priority output CF and the main orifice A1 which could cause a pressure drop so that the full pressure difference between the pressure at the load sensing point 17 in the main flow path 7 and the priority outlet CF of the priority valve arrangement 10 is used to drive a flow of hydraulic fluid through the main orifice A1.

In the same way there is no check valve between the load sensing point 17 in the main flow path 7 and the load sensing port 16 of the priority valve arrangement 10. The priority valve arrangement 10 can still have a load sensing orifice ALS which, however, is not shown in FIGS. 2 and 3.

A pressure relief valve 23 is arranged between the load sensing point 17 and the return port. This valve ensures that the load sensing pressure does not increase above what is allowable or specified.

A check valve 24 opening in a direction towards the working port 5 of the main flow path 7 is arranged downstream the load sensing point 17, more precisely downstream the second flow meter orifice A3 and more precisely between the second flow meter orifice A3 and the first working port orifice A4.

Alternatively, the check valve 24 can be arranged upstream the first flow meter orifice A2, i.e. between the load sensing point 17 and the first flow meter orifice A2.

In both cases it is possible to avoid a kick back, since a pressure spike produced by the steering motor 22 and transmitted to the main flow path 7 via the respective working port 5, 6 does not produce a reverse flow through the main flow path 7, so that the driver of the vehicle does not experience a negative impact on the steering wheel.

The respective check valve 24 is arranged just downstream the second flow meter orifice A3 (FIG. 2) or just upstream the first flow meter orifice A2 (FIG. 3).

In both cases it is possible to arrange the check valve 24 in the housing which accommodates the set of spool and sleeve, so that the check valve 24 can be arranged as close as possible to this set of spool and sleeve which defines the respective orifices.

The check valve 24 comprises a valve element 29, for example in form of a ball made of steel or another material, which in one position seals against a part 30 of the housing 25 and in another position is held in place by component 31 mounted in the housing 25 from the outside of the housing. The part 30 of the housing forms a valve seat. The component 31 is mounted from a front face 32 of the housing 25 and is preferably screwed into the housing. The component 31 forms a stop 33 for the valve element 29. Thus, the valve element 29 can be moved between a first position, in which the check valve 24 is closed and in which the valve element 29 seals against the part 30 of the housing 25, and a second position, in which the valve element 29 is moved away from the part 30 of the housing 25, i.e. from the valve seat, so that the check valve 24 is open. The stop 33 limits a movement of the valve element 29.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A hydraulic steering arrangement comprising a supply port, a return port, a working port arrangement having two working ports, a main flow path between the supply port and one of the working ports and a return flow path between the other working port and the return port, wherein the main flow path comprises a main orifice, a flow meter, a first flow meter orifice upstream the flow meter, a second flow meter orifice downstream the flow meter, and a first working port orifice, the return flow path comprises a second working port orifice, a load sensing point is arranged between the main orifice and the first flow meter orifice, a drain orifice is arranged between the load sensing point and the return port, and a priority valve arrangement is arranged between the supply port and the main orifice, wherein a load sensing port of the priority valve arrangement is connected to the load sensing point, wherein a priority outlet of the priority valve arrangement is directly connected to the main orifice, the load sensing port of the priority valve arrangement is directly connected to the load sensing point and the main flow path comprises a check valve between the load sensing point and the working port of the main flow path, the check valve opening in a direction towards the working port.

2. The hydraulic steering arrangement according to claim 1, wherein the check valve is arranged between the load sensing point and the first flow meter orifice.

3. The hydraulic steering arrangement according to claim to claim 1, wherein the check valve is arranged downstream the second flow meter orifice.

4. The hydraulic steering arrangement according to claim 3, wherein the check valve is arranged between the second flow meter orifice and the working port orifice of the main flow path.

5. The hydraulic steering arrangement according to claim 1, wherein it comprises a housing and a set of spool and sleeve in a bore of the housing, wherein the check valve is arranged in the housing.

6. The hydraulic steering arrangement according to claim 5, wherein the check valve comprises a valve element which in one position seals against a part of the housing and in another position is held in place by a component mounted in the housing from the outside of the housing.

7. The hydraulic steering arrangement according to claim 6, wherein the component is mounted in the housing from a front face of the housing.

8. The hydraulic steering arrangement according to claim 7, wherein the component is screwed into the housing.

9. The hydraulic steering arrangement according to claim 1, wherein the priority valve arrangement comprises a load sensing flow path from the priority outlet to the load sensing port.

* * * * *